(No Model.)
R. RAPHAEL.
DRESS SHIELD.
No. 513,416. Patented Jan. 23, 1894.
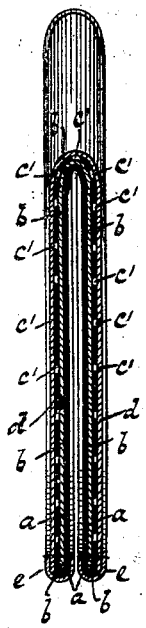
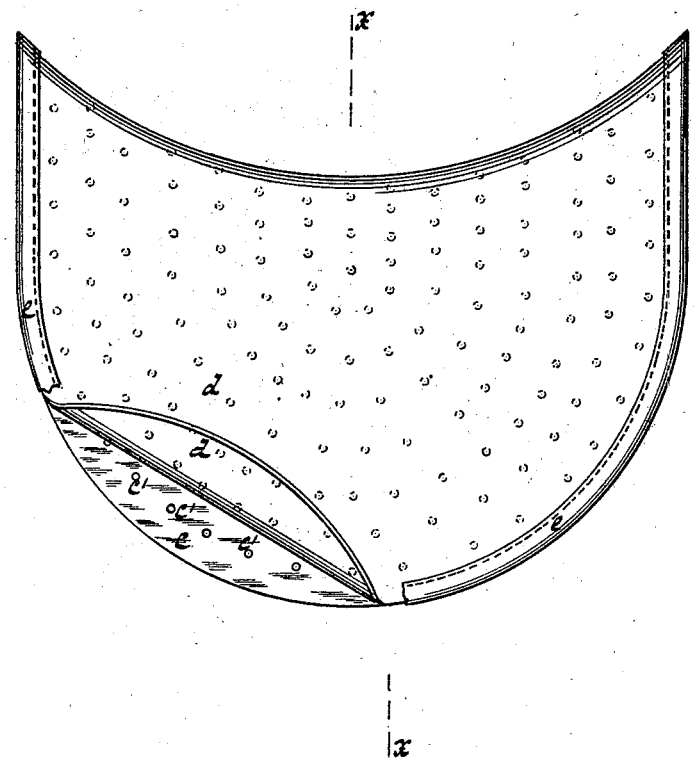
WITNESSES:
William J. Miller
Chas. E. Poensgen
INVENTOR:
Robert Raphael
BY
Hauff & Hauff
ATTORNEYS.

UNITED STATES PATENT OFFICE.

ROBERT RAPHAEL, OF BROOKLYN, NEW YORK.

DRESS-SHIELD.

SPECIFICATION forming part of Letters Patent No. 513,416, dated January 23, 1894.

Application filed May 18, 1893. Serial No. 474,690. (No model.)

*To all whom it may concern:*

Be it known that I, ROBERT RAPHAEL, a citizen of the United States, residing at Brooklyn, in the county of Kings and State of New York, have invented new and useful Improvements in Dress-Shields, of which the following is a specification.

The object of this invention is a dress-shield which is constructed to collect and retain the perspiration and which can be readily washed from time to time so as to restore its action without danger of producing wrinkles.

The peculiar and novel construction of my dress-shield is pointed out in the following specification and claims and illustrated in the accompanying drawings, in which—

Figure 1 is a face view and Fig. 2 is a transverse vertical section in the plane $x$ $x$ Fig. 1.

My dress-shield is composed of four layers $a, b, c, d$, the inside layer $a$ being made of a waterproof substance such as rubber, while the next layer $b$ is composed of an absorbent material such as felt and the third layer $c$ is of a waterproof material such as rubber, while the outside layer or cover $d$ is made of stockinet or equivalent material. The absorbent layer $b$ is secured to the inside layer $a$ by a suitable adhesive such as rubber cement and the third layer $c$ is provided with perforations $c'$ in its sides as well in its top or bight and this layer projects beyond the absorbent layer and its projecting edge is secured to the inside layer $a$ so as to prevent the escape of moisture from the absorbent layer. The outside layer or covering $d$ is connected to the layers $a, b, c$ by a binding strip $e$.

By means of the perforations $c'$ in the layer $c$ the perspiration finds ready access to the absorbent layer $b$ and since the bottom edge of this layer is inclosed between the bottom edges of the waterproof layers $a$ and $c$, the moisture which has collected in the absorbent layer, cannot escape. It has already been stated, that the absorbent layer $b$ is secured to the inside layer $a$ by a suitable cement so that when the dress-shield is placed into water or soapsuds, it can be readily manipulated for the purpose of washing out the impurities without danger that the absorbent material shall form wrinkles and when the dress-shield is treated with smoothing irons or otherwise after having been washed, it is as good as new.

What I claim as new, and desire to secure by Letters Patent, is—

1. As an improved article of manufacture, a dress shield consisting of an internal waterproof layer $a$, an absorbent layer $b$ superimposed on the waterproof layer, a perforated waterproof layer $c$ superimposed on the absorbent layer, and an external covering layer $d$ which entirely covers the perforated waterproof layer, substantially as described.

2. A dress-shield composed of an inner waterproof layer $a$, an absorbent layer $b$ cemented to the layer $a$, a perforated waterproof layer $c$ extending beyond the absorbent layer $b$ and fastened at its projecting edge to the layer $a$ and a covering layer $d$ substantially as described.

In testimony whereof I have hereunto set my hand in the presence of two subscribing witnesses.

ROBERT RAPHAEL.

Witnesses:
WM. C. HAUFF,
E. F. KASTENHUBER.